(No Model.)

C. E. HOGEBOOM.
HARROW TOOTH ATTACHMENT.

No. 325,839. Patented Sept. 8, 1885.

Witnesses
H. C. McArthur
A. S. Paré

Inventor
Charles E. Hogeboom
per
H. Harrison
Attorney

UNITED STATES PATENT OFFICE.

CHARLES E. HOGEBOOM, OF EAU CLAIRE, WISCONSIN.

HARROW-TOOTH ATTACHMENT.

SPECIFICATION forming part of Letters Patent No. 325,839, dated September 8, 1885.

Application filed August 9, 1884. (No model.)

*To all whom it may concern:*

Be it known that I, CHARLES E. HOGEBOOM, a citizen of the United States, residing at Eau Claire, in the county of Eau Claire and State of Wisconsin, have invented certain new and useful Improvements in Harrow-Tooth Attachments, of which the following is a specification, to wit:

This invention relates to an improvement in harrow-tooth attachments; and it consists of a collar adjustably secured to the tooth, and provided with a blade secured at right angles to the collar, substantially as will be hereinafter more fully set forth and claimed.

In order to enable others skilled in the art to which my invention appertains to make and use the same, I will now proceed to describe its construction and operation, referring to the accompanying drawings, in which—

Figure 2:
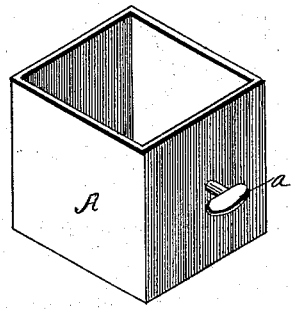
Figure 1:
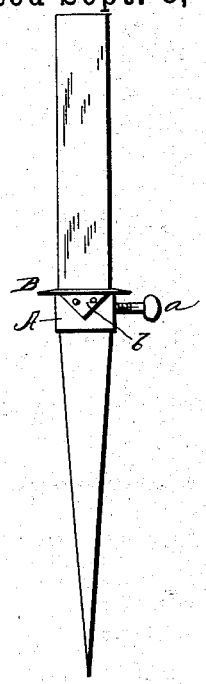
Figure 4:
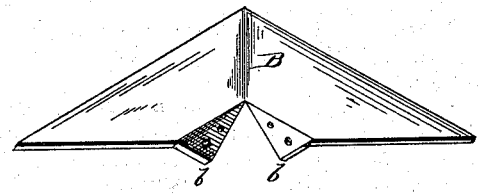
Figure 3:
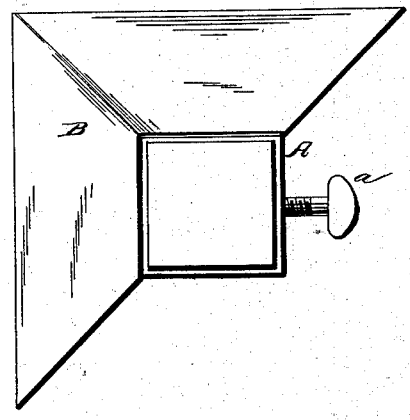

Figure 1 is a side view of a harrow-tooth with my invention attached. Fig. 2 is a perspective view of the collar; Fig. 3, plan view of the blade and collar in shape for use, and Fig. 4 a perspective view of the blade itself.

A represents a band or sleeve of metal made to fit around a harrow-tooth, and provided with a set-screw, $a$, for securing it in any desired position. To this sleeve or collar is secured a metal blade, B, consisting of a triangular sheet of metal, having its rear center slit and the corners turned down to form flanges $b$, which are riveted to the collar.

This device is placed on a harrow-tooth, usually near the lower end, or sufficiently low to enter the ground. The blade is then drawn along just beneath the surface, turning and loosening the ground and cutting the roots of weeds, &c. It is easily and quickly attached to any harrow and adjusted to any desired depth.

Having thus fully described my invention, what I claim as new, and desire to secure by Letters Patent, is—

A harrow-tooth attachment, consisting of the collar or band A, having a set-screw, $a$, and the blade B, having its rear side notched and formed with flanges $b$ riveted to the band, substantially as set forth.

In testimony whereof I affix my signature in presence of two witnesses.

CHAS. E. HOGEBOOM.

Witnesses:
W. W. DOWNS.
GEORGE W. THOMAS.